US007000517B1

(12) United States Patent
Spix et al.

(10) Patent No.: US 7,000,517 B1
(45) Date of Patent: Feb. 21, 2006

(54) MACHINE FOR CROSS CUTTING A MATERIAL WEB

(75) Inventors: Guido Spix, Kaarst (DE); Albert Stitz, Kürten (DE); Karl Thievessen, Grevenbroich (DE)

(73) Assignee: Jagenberg Querschneider GmbH, Neuss (DE)

( * ) Notice: Subject to any disclaimer, the term of this patent is extended or adjusted under 35 U.S.C. 154(b) by 0 days.

(21) Appl. No.: 10/070,232

(22) PCT Filed: Aug. 11, 2000

(86) PCT No.: PCT/EP00/07859

§ 371 (c)(1), (2), (4) Date: Mar. 20, 2002

(87) PCT Pub. No.: WO01/15875

PCT Pub. Date: Mar. 8, 2001

(30) Foreign Application Priority Data

Sep. 1, 1999 (DE) ................................ 199 41 581

(51) Int. Cl.
*B23D 25/12* (2006.01)
*B23D 25/02* (2006.01)

(52) U.S. Cl. ........................................... 83/343; 83/346

(58) Field of Classification Search .................. 83/343, 83/346, 502, 504, 700, 500, 344, 512, 560, 83/698, 341, 481, 854, 324, 859, 663, 698.41, 83/698.42, 698.51, 501, 658, 47 D, 622, 83/618, 349, 347, 42, 41; 242/525.4, 538.5, 242/383.2; 226/96, 117; 101/175, 177, 101/216

See application file for complete search history.

(56) References Cited

U.S. PATENT DOCUMENTS

| | | | | | |
|---|---|---|---|---|---|
| 391,949 | A | * | 10/1888 | Cottrell | 83/342 |
| 1,318,892 | A | * | 10/1919 | Maier | 83/296 |
| 2,157,455 | A | * | 5/1939 | Kimmel | 72/241.2 |
| 3,119,339 | A | * | 1/1964 | Clarke et al. | 418/9 |
| 3,155,037 | A | * | 11/1964 | Haskin, Jr. | 101/364 |
| 3,449,032 | A | * | 6/1969 | Scheufler | 384/278 |
| 3,570,348 | A | * | 3/1971 | Hallden | 83/342 |
| 3,720,126 | A | * | 3/1973 | Kranz | 83/344 |
| 3,905,264 | A | * | 9/1975 | Eddy | 83/481 |
| 4,009,626 | A | * | 3/1977 | Gressman | 83/116 |

(Continued)

FOREIGN PATENT DOCUMENTS

DE 39 17 492 1/1990

(Continued)

*Primary Examiner*—Allan N. Shoap
*Assistant Examiner*—Ghassem Alie
(74) *Attorney, Agent, or Firm*—Herbert Dubno; Andrew Wilford

(57) ABSTRACT

A machine for cross cutting a material web has a main frame part unitarily formed with a pair of transversely spaced main sides and with at least one main traverse extending transversely between the main sides and a secondary frame part unitarily formed with a pair of transversely spaced secondary sides and with at least one secondary traverse extending transversely between the secondary sides. The main frame part is formed at its sides with a seat on which the respective sides of the secondary frame part fit complementarily with the main and secondary traverses extending parallel to each other. Two blade drums rotatable about respective transversely extending drum axes have ends journaled in the sides at the seat. Fasteners secure the frame parts together at the seat to opposite sides of the drum ends.

4 Claims, 3 Drawing Sheets

U.S. PATENT DOCUMENTS

| | | | | | |
|---|---|---|---|---|---|
| 4,111,120 | A | * | 9/1978 | Paulson | 101/175 |
| 4,144,811 | A | * | 3/1979 | Barnett | 101/349.1 |
| 4,428,265 | A | * | 1/1984 | Bolton | 83/502 |
| 4,793,229 | A | * | 12/1988 | Kleber | 83/344 |
| 4,805,501 | A | * | 2/1989 | Nuttin | 83/300 |
| 4,881,436 | A | * | 11/1989 | Rommel | 83/342 |
| 4,926,730 | A | * | 5/1990 | Garrett | 83/499 |
| 4,934,264 | A | * | 6/1990 | Gansky et al. | 101/175 |
| 5,058,472 | A | * | 10/1991 | Kakko-Chiloff | 83/344 |
| 5,060,569 | A | * | 10/1991 | Gladow | 101/216 |
| 5,186,090 | A | * | 2/1993 | Bunch, Jr. | 83/341 |
| 5,207,138 | A | * | 5/1993 | Sato et al. | 83/337 |
| 5,313,864 | A | * | 5/1994 | Forgash et al. | 83/349 |
| 5,657,934 | A | * | 8/1997 | Pirrung et al. | 241/242 |
| 5,713,256 | A | * | 2/1998 | Keeny | 83/26 |
| 5,788,169 | A | * | 8/1998 | Koenig | 241/236 |
| 5,802,941 | A | | 9/1998 | Kline | |
| 5,857,396 | A | * | 1/1999 | Strouse, Jr. | 83/502 |
| 5,873,293 | A | * | 2/1999 | Yamazaki | 83/497 |
| 5,906,569 | A | * | 5/1999 | Ratzel | 493/363 |
| 5,908,569 | A | * | 6/1999 | Wilkening et al. | 493/363 |
| 5,915,644 | A | | 6/1999 | Prittie | |
| 5,960,714 | A | * | 10/1999 | Gottling et al. | 101/216 |
| 6,370,998 | B1 | * | 4/2002 | Yokoro et al. | 83/698.11 |

FOREIGN PATENT DOCUMENTS

| | | |
|---|---|---|
| EP | 0234 559 | 9/1887 |

* cited by examiner

MACHINE FOR CROSS CUTTING A MATERIAL WEB

CROSS REFERENCE TO RELATED APPLICATIONS

This invention is the US national phase of PCT application PCT/EP00/07859 filed 11 Aug. 2000 with a claim to the priority of German application 199 41 581.1 filed 1 Sep. 1999.

FIELD OF THE INVENTION

The invention relates to a machine for crosscutting material webs, in particular paper or cardboard webs, with a machine frame comprising a pair of side walls on each side of the machine, crosswise traverses transversely interconnecting the side walls, and two blade drums that are journaled at their axial ends in the side walls.

BACKGROUND OF THE INVENTION

Machines for crosscutting paper or cardboard webs have as is known two rotatably mounted blade drums mounted one above the other in a machine frame and having blades that cut through a material web passing through between them. The machine frame is comprised of side walls that are connected to each other by means of crosswise traverses. In the known crosscutting machines the machine frame is constructed of welded steel. The traverses are welded to the side walls. Normally the side walls are made of several side parts that are screwed or welded together. Such a construction is seen in German 198 03 522.

OBJECT OF THE INVENTION

It is an object of the invention to so improve on a crosscutting machine of this type that as a result of simple construction it can cut material webs at high speed with a very great production rate.

SUMMARY OF THE INVENTION

These objects are achieved according to the invention in that the side walls of the machine frame are each formed of side parts, the side parts each having one longitudinal side formed unitarily by casting with at least one of the traverses.

This construction makes extremely tight manufacturing tolerances possible and ensures that the frame is extremely stiff since no stability-harming bolts are employed. Furthermore the frame is simple to assemble since it is formed of fewer parts.

In a preferred embodiment the machine frame is formed of two frame parts, each frame part being formed of two side parts joined by at least one traverse. The separation line between two side parts extends on each longitudinal side through rotation axes of the blade drums. This construction has the advantage that the blade drums are very simple to install and remove.

In a particularly advantageous embodiment the machine frame is formed of a main frame part that has a step below a bearing of the drums and a secondary frame part set on this step.

According to the preferred embodiment the side parts have cast bearing races for holding the bearings in which the blade drums are journaled. Since there is no bolted-on bearing flange, the bearing seats can be set closer to each other. This makes it possible to use larger-diameter roller bearings and thus provide the blade drums with thicker shaft pins.

In a preferred embodiment a web feeder formed of two pinch rollers is positioned upstream in a web-travel direction from the blade drums in the machine frame. The feeder thus does not need its own frame.

According to an embodiment of the invention, all wide additional machine elements, in particular gears of the blade drums and a lifter for one of the feed rollers, are mounted outside the side walls. This makes it possible to make the machine frame as narrow as possible with a spacing between the side walls that is at most 200 mm wider than the maximum web width of the passing material web. This construction has the further advantage that the additional machine elements are readily accessible for servicing.

BRIEF DESCRIPTION OF THE DRAWING

The drawing serves for describing the invention with reference to a simplified embodiment. Therein.

EMBODIMENTS OF THE INVENTION

Figure 1:
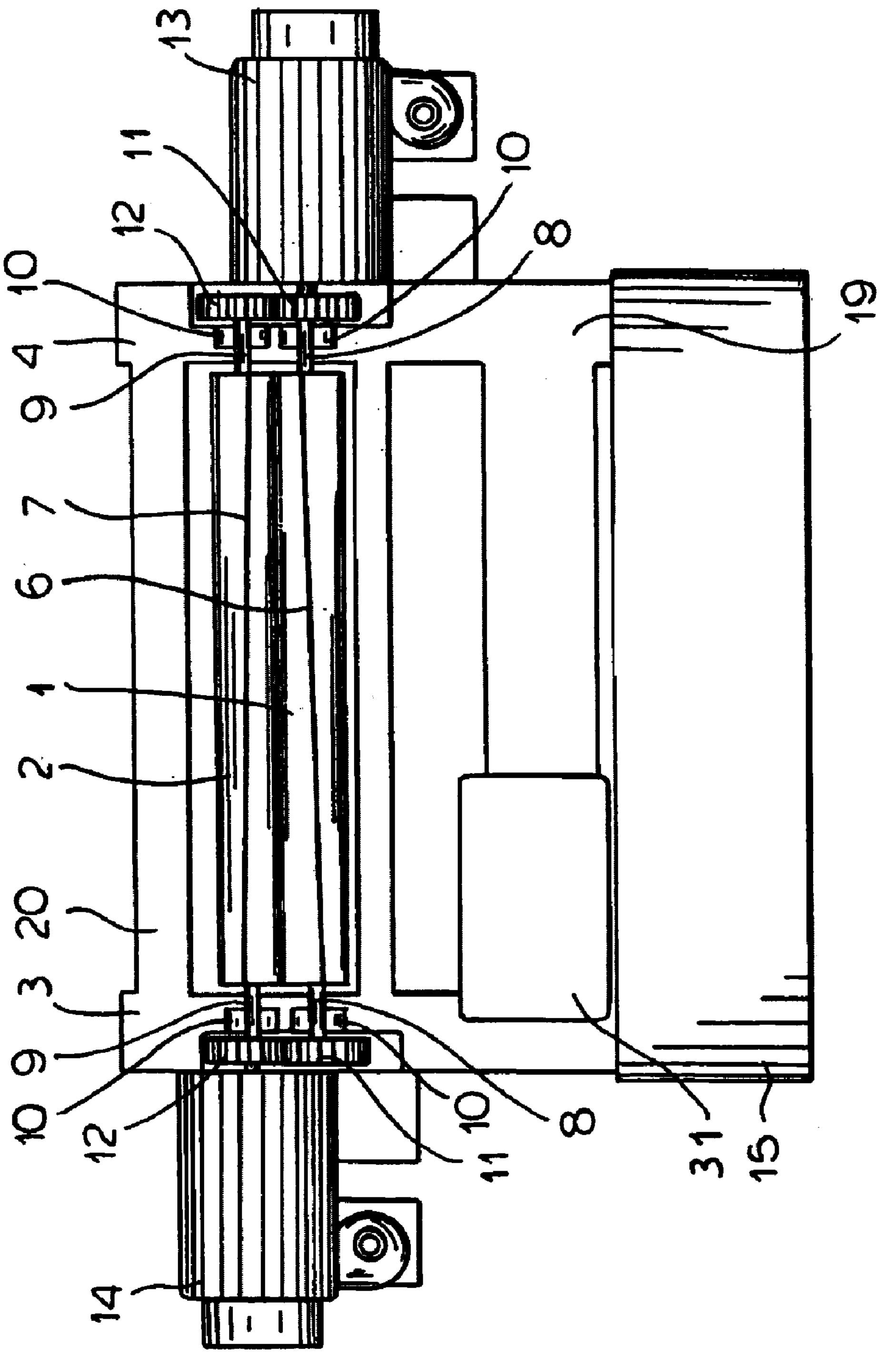
FIG. 1 is a view in the web-travel direction of the crosscutting machine.
Figure 2:
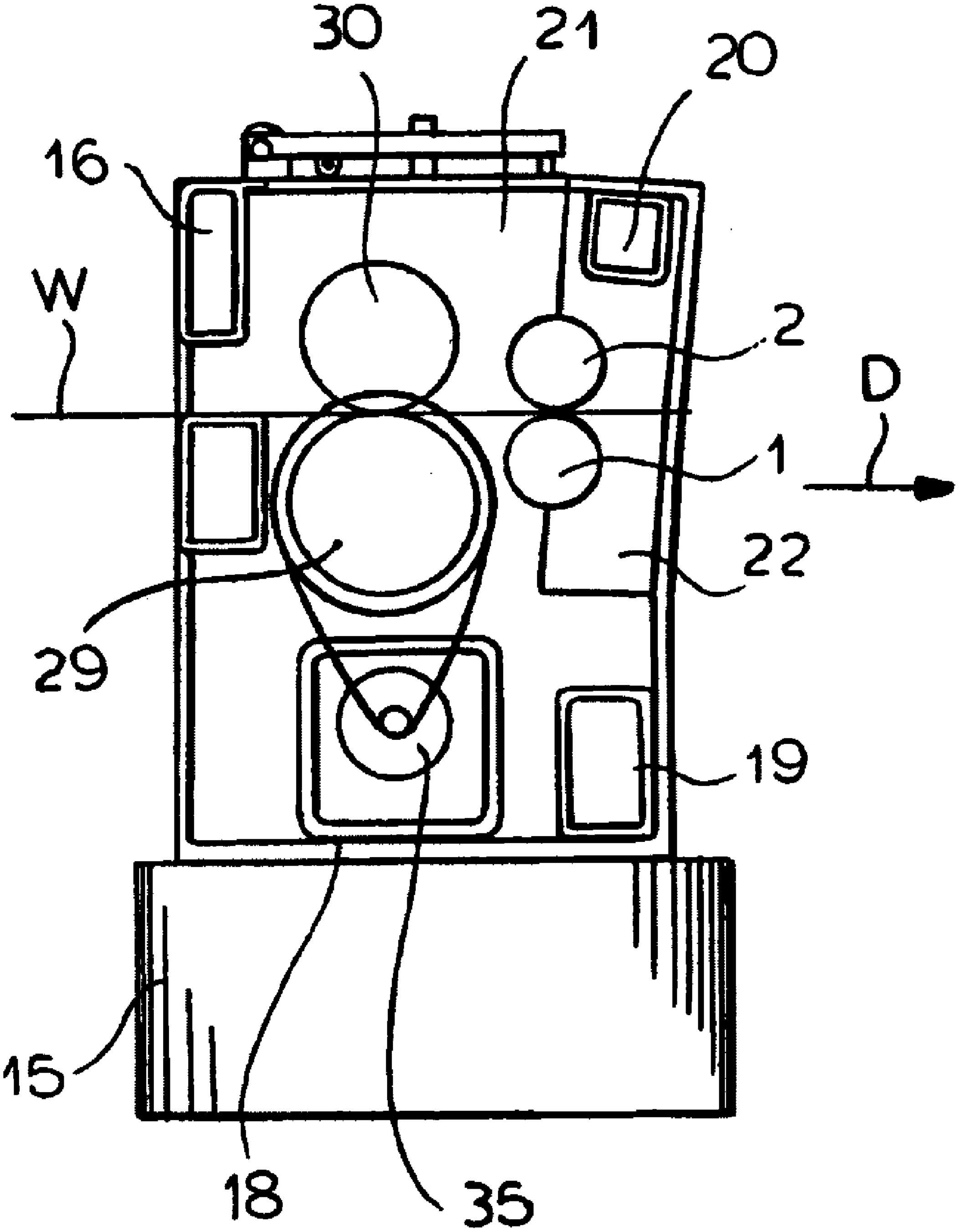
FIG. 2 is a side view.

The crosscutting machine shown schematically in section in FIGS. 1 and 2 serves for transversely cutting paper or cardboard webs W for the manufacture of paper or cardboard sheets. It works at web-travel speeds of more than 100 m/min, for example 400 m/min, and produces sheets in lengths of about 400 mm to about 200 mm. Its working width, that is the maximum width of the web W being handled, is in the range of one to several meters, here 2200 mm. The desired format widths are set by longitudinally cutting the web W by means of an unillustrated longitudinal cutter that separates the web W before crosscutting into individual strips of the desired width.

The crosscutting machine has two blade drums 1 and 2 that are journaled at their axial ends in side walls 3 and 4 of the machine frame. The two blade drums 1 and 2 are set one above the other with parallel rotation axes. The drums 1 and 2 are provided on their peripheries with respective blades 6 and 7 that extend as is standard helicoidally and axially over the working width. They are set so relative to each other that they cut through the passing web W, the helicoidal shape of the blades 6 and 7 ensuring that the passing web W is severed perpendicular to the travel direction D.

Each blade drum 1, 2 is formed of a cylindrical base body on whose ends are respective pins 8, 9. The pins 8 and 9 are supported by roller bearings 10 in the side walls 3 and 4. The pins 8 and 9 are provided with respective synchronization gears 11 and 12, the gear 12 being on the upper blade drum 2 and the gear 11 on the lower blade drum 1. The gears 11 and 12 are arranged on the outside of the side walls 3 and 4. At least one pin 8 or 9 is coupled to an electric motor serving as drive for the drums 1 and 2 and flanged to the outside of one of the sidewalls 3 and 4 of the machine frame. In the illustrated embodiment there are two drive motors 13 and 14 set Z-fashion on opposite sides of the machine and connected to the drums 1 and 2.

Figure 3:
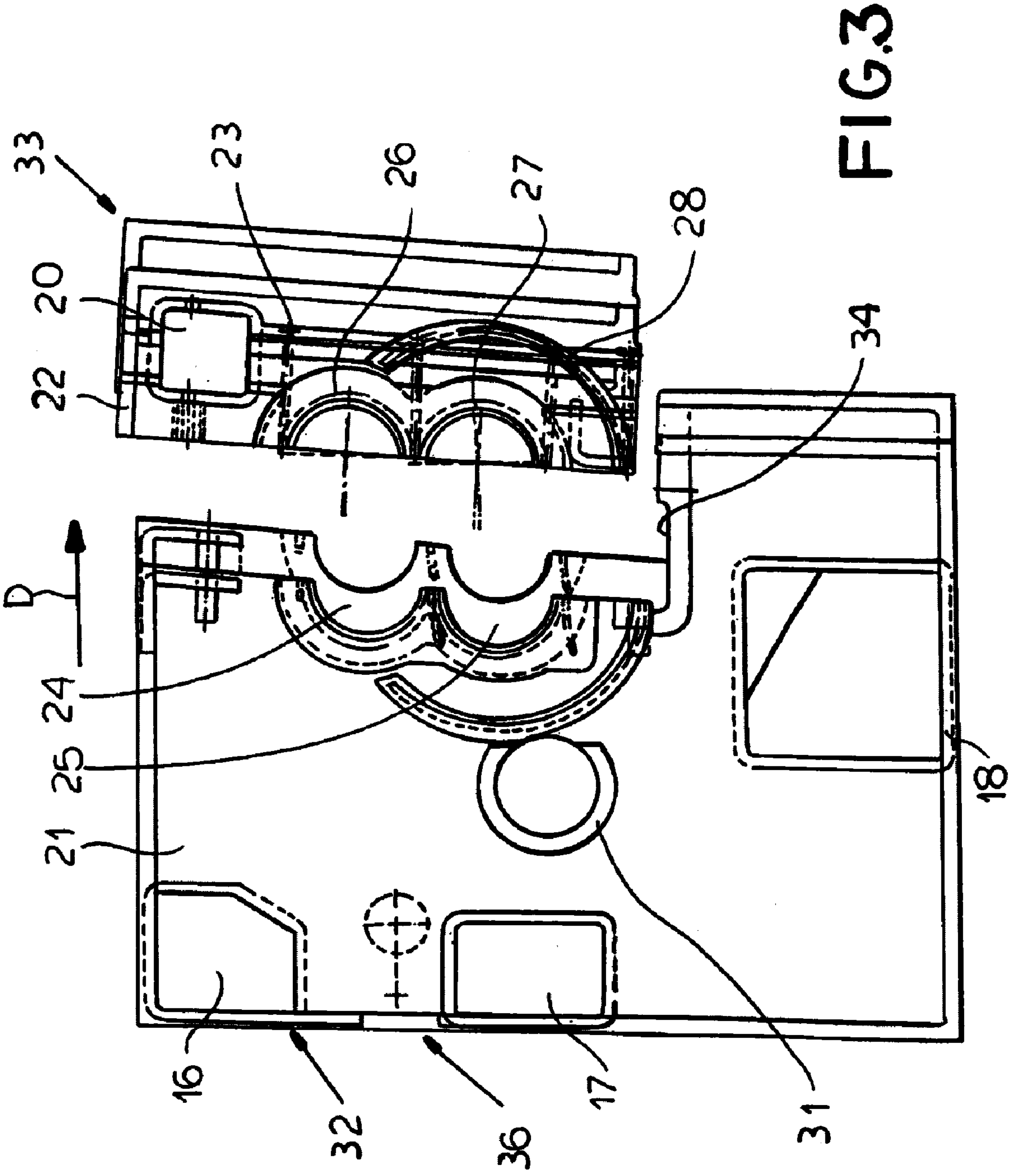
FIG. 3 is a side view of the machine frame with the main and secondary parts separated.

The machine frame sits on a base 15 and has the two side walls 3 and 4 and traverses 16, 17, 18, and 19 that transversely interconnect the side walls 3 and 4. As shown in FIGS. 2 and 3, each side wall 3 and 4 is formed of two side parts 21 and 22 connected together by screws 23. It is significant to the invention that the side walls 3 and 4 are each made of side parts 21 and 22 and that the side parts 21 and 22 are unitarily cast on both longitudinal sides with at least one, and preferably all, of the connecting traverses 16, 20.

In the embodiment of FIGS. 2 and 3 the frame comprises a main frame part 32 that is comprised of the two side parts 21 and the traverses 16, 17, 18, and 19 cast unitarily with the side parts 21. Each further side part 22 forms with the connecting traverse 20 unitarily cast with the other side part 22 a secondary frame part 33 that is solidly screwed to the main frame part 32. Each side wall 3 and 4 is split such that the separation line runs partially straight between two side parts 21 and 22 through the rotation axes of the two blade drums 1 and 2. Each side part 21 of the main frame part 32 is provided below the bearings for the blade drums 1 and 2 with a horizontal step. This step supports the respective side part 22 of the secondary frame part 33.

As shown in FIG. 3, the side part 21 has on an upright face, on which the side parts 21 and 22 are screwed together, two spaced and vertically offset semicircular cutouts 24 and 25, and the side part 22 has two similar cutouts 26 and 27. When set together the two pairs of cutouts 24, 25, 26, and 27 form a pair of circular bearing seats in which the bearings 10 of blade drums 1 and 2 are set. A bearing race is externally cast around each bearing seat so that no additional bearing flange is needed. Two further semicircular bearing races 28, which are also cast as part of the respective side parts 21 and 22, form a mounting flange for a drive motor 14.

The two-part construction of the machine frame makes it possible to quickly open the bearing of a blade drum and thus quickly remove and replace one of the blade drums 1 and 2.

Immediately upstream of the web-travel direction D, from left to right in FIG. 2, is a web feeder that is formed of two pinch rollers 29 and 30. The lower feed roller 29 is driven by a belt from a drive motor 35 that is fixed to the side wall 3. It is journaled at each axial end in a bearing 31 of a side part 21. The upper feed roller 30 is freely rotatable and can be lifted from the lower feed roller 29 so that a web W can be fed between the two rollers 29 and 30. The ability to lift the upper roller 30 is facilitated in that its ends are carried in annular bearing sleeves that are eccentrically rotatable in the respective side part 21. The eccentrically journaled bearings are connected via levers with a pneumatic piston/cylinder unit that serves as lifter for the upper feed roller 30. The pneumatic piston/cylinder unit and the lever engaging the bearing are mounted on the outside of each side wall 3 and 4. FIG. 3 shows the opening 32 in a side wall 21 through which the respective lever is connected with the internal bearing.

In order to improve the stability of the machine frame, the spacing between the side walls 3 and 4 is maintained as small as possible. In this manner all the machine elements except for the blade drums, which have a width of more than 100 mm, are mounted outside the side walls 3 and 4. Such externally mounted machine elements include the gears 11 and 12, the lifter for the upper feed roller 30, and the drive for a web-clamping device. If the machine elements must for functional reasons be mounted inside within the maximum working width between the side walls 3 and 4, as for example the bearings of the upper feed roller 30, these are so constructed that their width is smaller than 100 mm. The clear distance between the side walls 3 and 4 is thus at most 200 mm wider than the maximum web width of the passing material web W.

What is claimed is:

1. A machine for cross cutting a material web, the machine comprising:

a main frame part unitarily formed by casting with a pair of transversely spaced main sides and with at least one main traverse extending transversely between the main sides, each of the main sides being unitarily formed by casting with a generally vertical seat and on the seat with an outwardly open and generally semicylindrical half bearing race, the seat having on each main side a respective horizontally extending step;

a secondary frame part unitarily formed by casting with a pair of transversely spaced secondary sides and with at least one secondary traverse extending transversely between the secondary sides, each side of the secondary frame part being unitarily formed by casting with an outwardly open and generally semicylindrical half bearing race;

fasteners securing the frame parts together with the secondary sides pressed against the steps of the seats of the main sides, the traverses extending parallel to each other, and each of the half bearing races of the secondary part fitting against and forming with a respective one of the half bearing races of the main part a respective full bearing race;

respective bearings set in the full bearing races; and two blade drums rotatable about respective transversely extending drum axes and having ends journaled in the bearings.

2. The web-crosscutting machine defined in claim 1, further comprising:

a pair of vertically offset feeder rollers horizontally spaced from the drum and journaled in the sides of the main frame part.

3. The web-crosscutting machine defined in claim 1 wherein the sides of the main and secondary frame parts have outer faces turned away from each other, the machine further comprising:

gearing mounted on the outer faces interconnecting the drums for joint synchronous rotation; and a drive motor mounted on one of the outer faces and connected to the drums for rotating same.

4. The web-crosscutting machine defined in claim 1 wherein the fasteners are bolts extending between the parts across the seats and offset from the drums.

* * * * *